United States Patent [19]

Shimogawa et al.

[11] 4,162,772
[45] Jul. 31, 1979

[54] SEAT BELT RETRACTING AND WINDING DEVICE

[75] Inventors: Toshiaki Shimogawa, Nishio; Satoshi Kuwakado, Aichi, both of Japan

[73] Assignee: Nippon Soken, Inc., Nishio, Japan

[21] Appl. No.: 867,499

[22] Filed: Jan. 6, 1978

[30] Foreign Application Priority Data

Feb. 18, 1977 [JP] Japan .......................... 52-19241[U]

[51] Int. Cl.$^2$ ...................... A62B 35/00; B65H 75/48
[52] U.S. Cl. .............................. 242/107; 242/107.4 R
[58] Field of Search ........................... 242/107–107.7; 297/388; 280/744–747

[56] References Cited

U.S. PATENT DOCUMENTS

| 3,984,063 | 10/1976 | Knieriemen | 242/107 |
| 4,026,494 | 5/1977 | Tanaka | 242/107.4 R X |

Primary Examiner—Harvey C. Hornsby
Assistant Examiner—John M. Jillions
Attorney, Agent, or Firm—Cushman, Darby & Cushman

[57] ABSTRACT

A seat belt retracting and winding device comprises a housing, a winding shaft rotatably mounted within the housing, a seat belt wound around the winding shaft with one end made fast to the winding shaft, a first and strong spring with one end made fast to the housing, a second and weak spring with one end made fast to the winding shaft, the second spring being connected in series to the first spring, and a control means which may cause the first spring not to exert its returning force on the seat belt in the direction in which is wound the seat belt when the seat belt is unwound and extended against the forces of both the first and second springs and is fastened and which may cause the first spring to exert its turning force on the seat belt when the latter is unfastened. The seat belt retracting and winding device further includes a means for relaxing an impact exerted on the second spring when the turning force of the first spring is exerted on the seat belt so that the quick compression or winding of the second spring may be avoided, the durability of not only the second spring but also a member retaining the second spring may be improved, the generation of noise may be minimized and a driver or an occupant may be refrained from being subjected to an unpleasant restraining force.

7 Claims, 9 Drawing Figures

F I G. 3
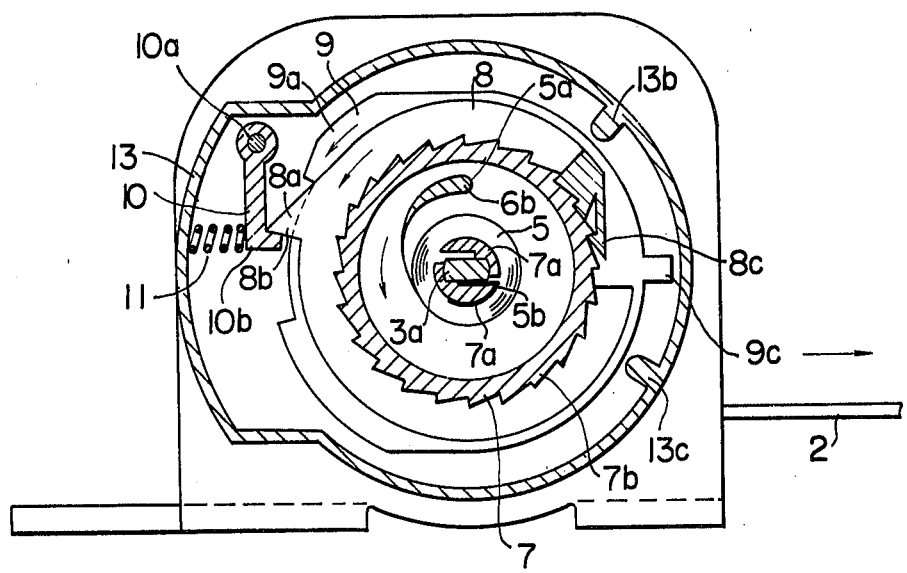
F I G. 4
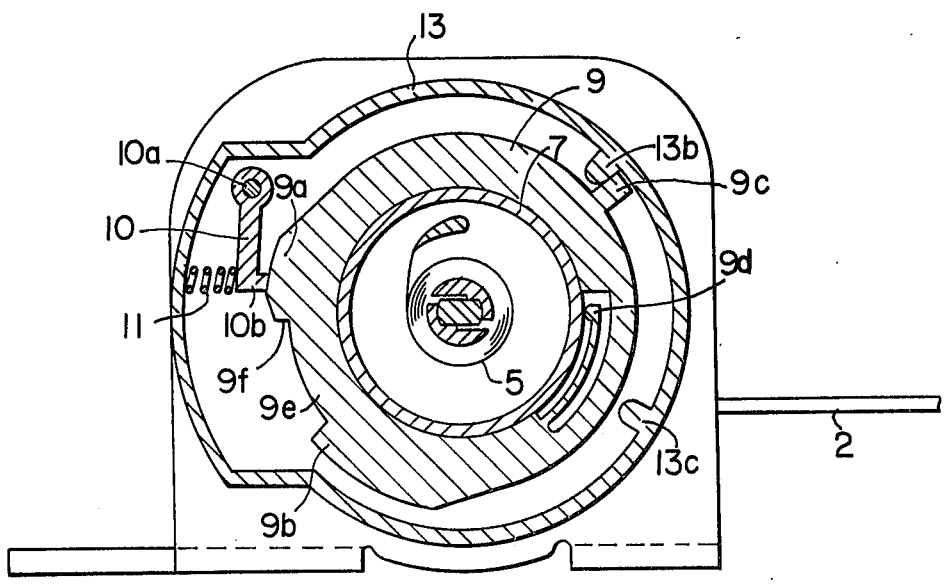

SEAT BELT RETRACTING AND WINDING DEVICE

The present invention relates to generally a device for automatically retracting and winding a seat belt, and more particularly to a device comprising a mechanism for controlling the retracting and winding force imparted to the seat belt, thereby not only permitting the free but safeguarded movement of a driver or an occupant without causing any excessive unpleasant feeling but also ensuring a long durability of spring means employed in the device.

In general, the prior art seat belt retracting and winding devices or retractors are provided with spiral spring means having its one end anchored to the shaft of a winding reel and its the other end securely attached to the main body or frame of the retractor in order to retract the seat belt and rewind it around the winding reel or shaft, and in order to relax the restraining force on a driver or an occupant an attempt has been made to reduce the force of the spring means, but the result was disadvantageous in that the seat belt could not be completely retracted and wound around the winding reel when the seat belt was unfastened.

In order to solve this problem, we had already proposed improved seat belt retracting and winding devices in commonly assigned previous patent applications, Ser. No. 787,534, which is a continuation application of Ser. No. 656,850, filed on Feb. 10, 1976 and now abandoned, and Ser. No. 809,633, filed on June 24, 1977. In one embodiment of these improved devices, first and second springs are connected in series to each other through a ratchet wheel which is locked or released depending upon the degree of extension of the seat belt, whereby the tension exerted on the seat belt may be varied. However the first spring is stronger than the second spring so that upon release of the ratchet wheel the turning force of the first and strong spring causes the second and weak spring to wind or compress itself very quickly. Therefore the durability of not only the second spring but also a member for retaining one end of the second spring is adversely affected, and the driver or the occupant is disturbed by unpleasant impact noise generated when the second spring is forced to completely wind or compress itself very quickly.

A first object of the present invention is therefore to provide a further improved seat belt retracting and winding device of the type including a first and strong spring and a second and weak spring connected in series with each other and wherein when a ratchet wheel is unlocked or released an impact to be exerted on the second spring may be relaxed, whereby the quick winding or compression of the second spring may be avoided and the durability of not only the second spring but also a member for retaining one end thereof may be improved.

A second object of the present invention is to provide a seat belt retracting and winding device of the type described and wherein when the ratchet wheel is unlocked or released an impact to be exerted on the second spring may be relaxed, whereby the generation of unpleasant noise may be avoided.

A third object of the present invention is to provide a seat belt retracting and winding device of the type described which achieves the aforementioned objects and wherein when the seat belt is fastened a reduced but safeguarded retracting or tightening force may be exerted on the seat belt but when the seat belt is once unfastened an increased retracting force may be exerted on the seat belt.

Briefly stated, to the above and other ends the present invention provides a seat belt retracting and winding device of the type comprising a housing, a winding shaft with a seat belt whose one end is made fast to said winding shaft and which is wound around said winding shaft, a first and strong spring one end of which is made fast to said housing, a second and weak spring one end of which is made fast to said winding shaft and which is connected in series to said first and strong spring, and control means which may restrain said first and strong spring from exerting its returning force to said seat belt when said seat belt is unwound and extended against the forces of both said first and strong spring and said second and weak spring and is fastened and when said seat belt is retracted and rewound and which may cause said first and strong spring to exert its returning force to said seat belt when said seat belt is unfastened, characterized in that said control means includes means for relaxing the impact to be exerted on said second and weak spring when said first and strong spring exerts its returning force to said seat belt.

Since the seat belt retracting and winding device in accordance with the present invention is provided with said means for relaxing the impact to be exerted on the second and weak spring when the seat belt is unfastened and the returning force of the first and strong spring is exerted on the seat belt as described above, the durability of not only the second and weak spring but also a member for retaining one end thereof may be considerably improved and the generation of unpleasant noise may be minimized.

The above and other objects, features and advantages of the present invention will become more apparent from the following description of one preferred embodiment thereof taken in conjunction with the accompanying drawings.

FIG. 3 is a sectional view taken along the line III—III of FIG. 1;

FIG. 4 is a sectional view taken along the line IV—IV of FIG. 1;

Figure 1:
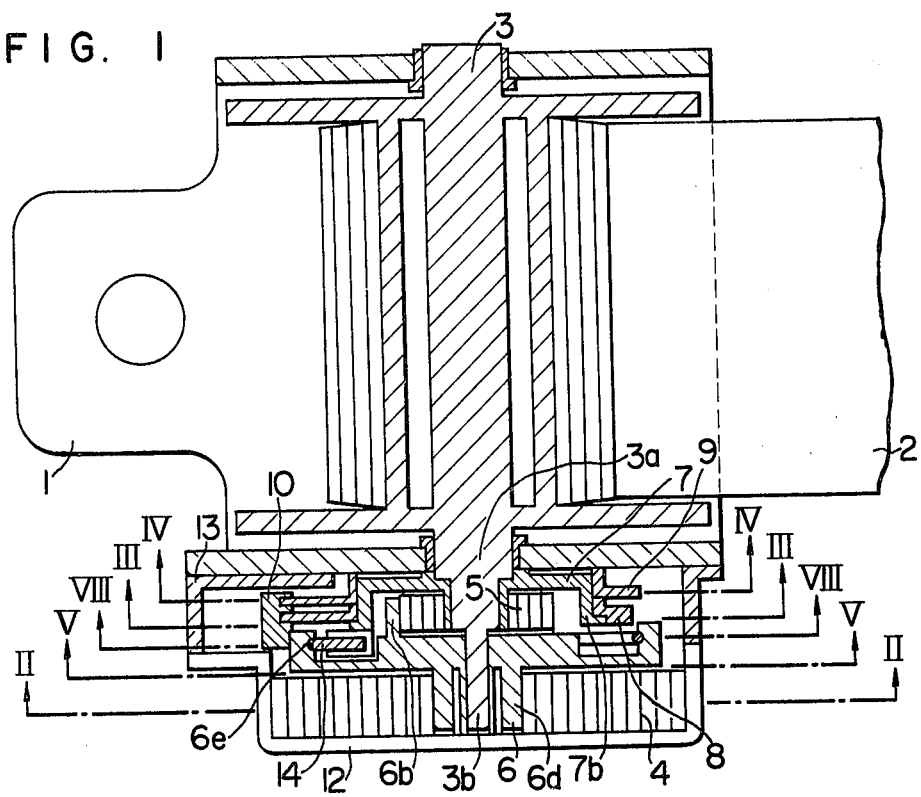
FIG. 1 is a vertical sectional view of a preferred embodiment of the present invention.

Referring to FIGS. 1 through 8, a seat belt retracting and winding device in accordance with the present invention has a main body or frame 1 which is so constructed and arranged as to rotatably support not only a winding shaft 3 but also various parts to be described below. A seat belt system comprises a seat belt 2 for restraining a driver or an occupant, one end of the seat belt 2 being made fast to the winding shaft 3 so as to be wound therearound while the other end being made fast to an anchor through a slip joint (both not shown).

The winding shaft 3 which is rotatably supported in the main body or frame 1 has a portion 3a which is nearly rectangular in cross section and is formed at one end portion of the winding shaft 3 for mounting thereon a driving wheel 7 to be described in detail hereinafter. The winding shaft 3 is further formed with a reduced diameter portion 3b which is axially outwardly extended from the portion 3a for rotatably mounting thereon a ratchet gear or wheel 6 to be described in detail hereinafter.

Figure 2:
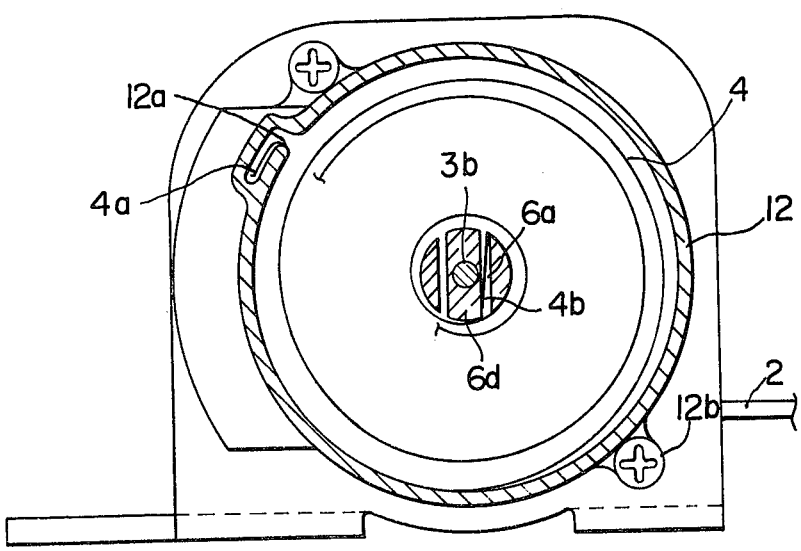
FIG 2 is a sectional view taken along the line II—II of FIG. 1.

As best shown in FIG. 2, a first spring 4 which is encased in a housing 12 has its outer end 4a securely fixed to the main body 1 by a hook or spring retaining pawl 12a formed integral with the housing 12, and has its inner end 4b securely retained in a slit 6a of the ratchet gear 6. As best shown in FIG. 3, a second spring 5 which is disposed within the ratchet gear 6 and whose both spring force and length are smaller than those of the first spring 4 has its outer end 5a securely retained in position by a spring retaining hook 6b of the ratchet gear 6 and its inner end 5b securely retained in position between the portion 3a of the winding shaft 3 and a mounting portion 7a of the driving wheel 7.

The first and second springs 4 and 5 are connected in series through the ratchet gear 6 to make up a spring assembly with one end securely made fast to the winding shaft 3 and the other end securely fixed to the main body 1 through the housing 12 in the manner described above. Therefore the first and second springs 4 and 5 function as one-piece spring when the ratchet gear 6 is permitted to freely rotate, whereby the belt winding force is imparted to the seat belt 2.

Figure 5:
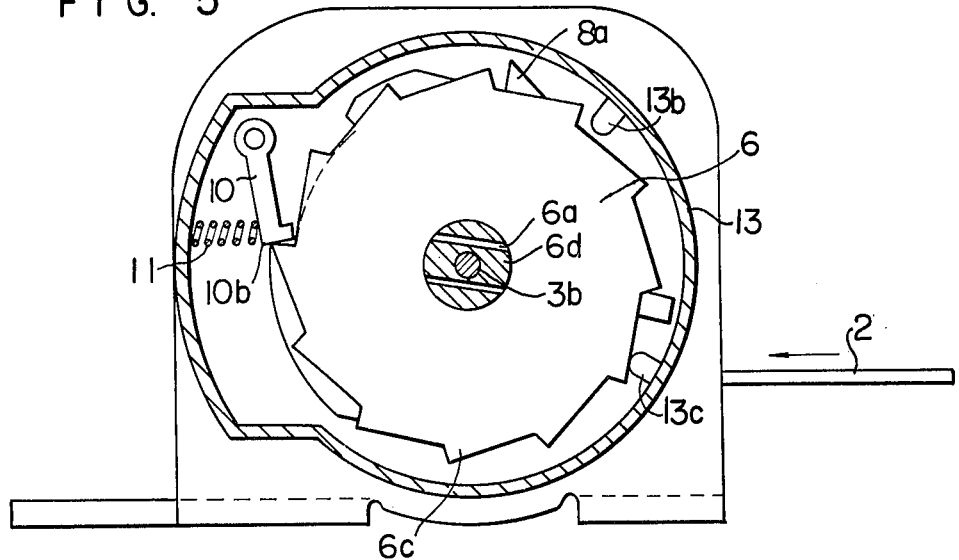
FIGS. 5, 6 and 7 are sectional views taken along the line V—V of FIG. 1.
Figure 6:
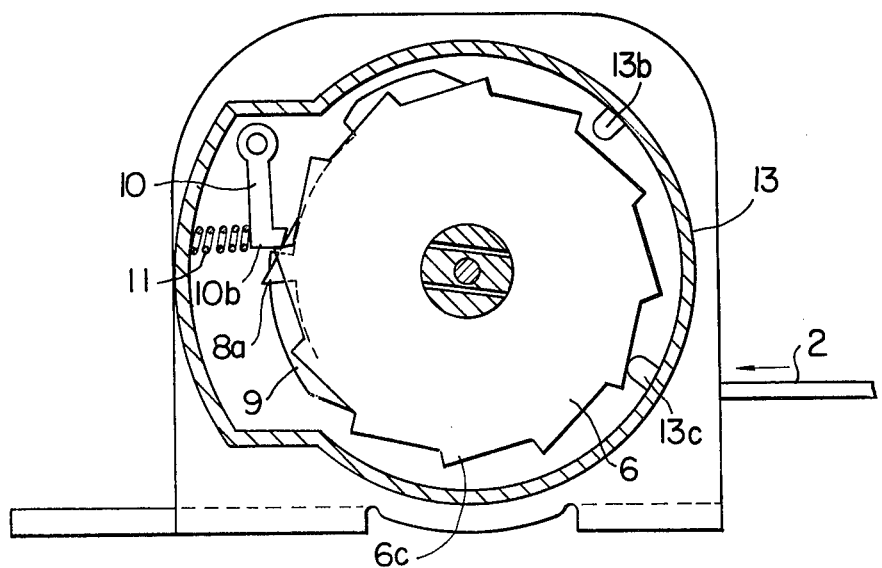

Referring to FIGS. 5 and 6, the ratchet gear 6 which is rotatably mounted on the reduced-diameter portion 3b of the winding shaft 3 for connecting in series the first and second springs 4 and 5 has, in addition to the slit 6a and the spring retaining hook 6b, ratchet teeth 6c for intermittent engagement with a detent, click or catch 10 in such a way that the ratchet gear 6 may be rotated only in one direction (Therefore the ratchet gear or wheel 6 is sometimes referred to as "a one-way or unidirectional ratchet wheel" in this specification) and a mounting portion 6d (See FIG. 1) which is rotatably mounted on the winding shaft 3.

The driving wheel 7 is securely fitted over the mounting portion 3a of the winding shaft 3 for rotation in unison therewith, encases therein the second spring 5 in the manner described above, carries coaxially a cam disk 8 and a catch or ratchet holding or retaining disk 9 to be described in detail hereinafter and has a one-way or unidirectional ratchet wheel 7b engageable with a pawl 8c of the cam disk 8 for rotation in unison therewith only in the clockwise direction in which the seat belt 2 is wound up. Therefore the driving wheel 7 and the cam disk or wheel 8 make up a one-way or nonreversible clutch.

Figure 8:
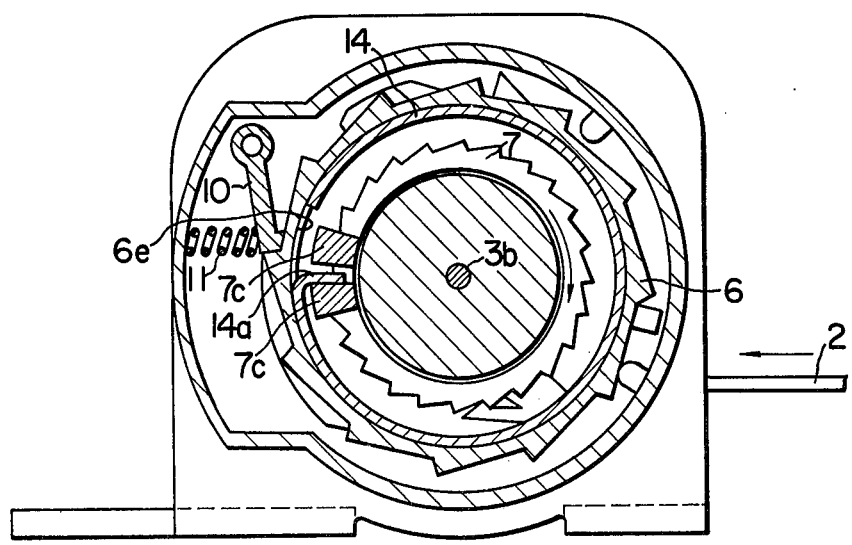
FIG. 8 is a sectional view taken along the line VIII—VIII of FIG. 1.

Referring particularly to FIG. 8, the driving wheel 7 is further formed with projections 7c extended radially outwardly for engagement with a hook-shaped end 14a of a friction ring 14 to be described in detail hereinafter. Therefore the ratchet gear 6 and the driving wheel 7 are operatively coupled through the friction ring 14 under a suitable frictional force.

Referring particularly to FIG. 3, the cam disk 8 which is securely fitted over the outer periphery of the driving wheel 7 coaxially thereof has, in addition to the pawl 8c, a cam portion 8a partly circumferentially outwardly extended for engagement with the catch 10 and a stop or stepped portion 8b contiguous with the cam portion 8a for engagement also with the catch 10 for restraining the cam disk 8 from rotation in the counterclockwise direction in which the seat belt 2 is unwound. Therefore the driving wheel 7 and the cam disk 8 constitute a one-way or nonreversible clutch in such a way that when the wheel 7 is rotated in the clockwise direction the cam disk 8 may be rotated in unison therewith but when the driving wheel 7 is rotated in the counterclockwise direction the cam disk 8 is caused to rotate only by small frictional forces therebetween.

As best shown in FIG. 4, the catch holding disk 9 which is rotatably mounted on the outer periphery of the driving wheel 7 coaxially thereof has a first ridge 9a and a second ridge 9b both of which are extended radially outwardly for selective engagement with a pawl 10b of the catch 10 for maintaining the unwinding or winding operation as will be described in detail hereinafter and a radially inwardly recessed portion or valley 9e between the first and second ridges 9a and 9b, a radially outwardly extended projection 9c for selective engagement with radially inwardly extended first and second projections or stops 13b and 13c of a second housing 13 to be described in detail hereinafter, and a spring 9d formed integral with the catch holding disk 9 and extended circumferentially along the interior periphery thereof for engagement with the exterior periphery of the driving wheel 7 so that the catch holding disk 9 may rotate in unison therewith. However the angle of rotation of the catch holding disk 9 is limited as will be described in more detail hereinafter during the rotation of the disk 9 in unison with the winding shaft 3 when the first or second ridge 9a or 9b engages the pawl 10b of the catch 10 and when the projection 9c engages either of the first stop 13b and the second stop 13c of the housing 13. That is, the disk 9 may be permitted to rotate in unison with the driving wheel 7 and hence the winding shaft 3 unless the catch 10 engages either of the first and second ridges 9a and 9b and unless the projection 9c engages either of the first stop 13b and the second stop 13c.

Referring to FIG. 3, one end of the catch 10 is pivotally mounted on a pivot pin 10a extended from the second housing 13 while the other end is terminated into the pawl 10b for engagement with the ratchet teeth 6c, the cam portion 8a of the cam disk 8 and the first and second ridges 9a and 9b of the catch holding disk 9. For this purpose, the width (in the axial direction) of the pawl 10b must be suitably selected.

The radial heights or distances between the axis of rotation of the winding shaft 3 and the most outwardly located points of the teeth 6c of the ratchet wheel 6, the cam portion 8a of the cam disk 8 and the first and second ridges 9a and 9b of the catch holding disk 9 are so selected as to satisfy the following relation:

cam portion 8a > first and second ridges 9a and 9b > teeth 6c of the ratchet wheel 6.

Referring to FIG. 3 or 4, a return spring 11 of the catch 10 is loaded between the interior surface of the housing 13 and a point adjacent to the pawl 10b of the catch 10 for normally biasing the catch 10 in the counterclockwise direction.

Referring to FIG. 2, the housing or casing 12 encases the first spring 4 therein in the manner described above, and has, in addition to the spring retaining hook 12a, mounting means 12b for attachment to the main body or frame 1.

Referring to FIG. 1, the housing or casing 13 encases therein the ratchet gear 6, the driving wheel 7, the cam disk 8, the catch holding disk 9, the catch 10, and the friction ring 14 and is mounted with screws or the like together with the housing or casing 12 to the main body 1.

Referring again to FIG. 8, the friction ring 14 is nearly circular in configuration, has the hook-shaped end 14a engaging with the projection 7c of the driving wheel 7 and is fitted into an annular recess 6e formed in the ratchet gear 6. When the driving wheel 7 is rotated in the clockwise direction, a light load is imparted to the friction ring 14, but when the ratchet gear 6 is rotated in the clockwise direction, a heavy load is imparted to the friction ring 14. It should be noted that the friction ring 14 is disposed in parallel with the second spring 5.

Next the mode of operation of the seat belt retracting and winding device with the above construction will be described. First referring to FIG. 3, the mode of unwinding the seat belt 2 for restraining a driver or an occupant will be described. As the seat belt 2 is unwound, the winding shaft 3 is rotated in the counterclockwise direction and so is the driving wheel 7 so that the cam disk 8 carried by the driving wheel 7 rotates in the same direction until the catch 10 engages the second stop 8b. Even upon engagement of the stop 8b of the cam disk 8 with the pawl 10b of the catch 10, the pawl 8c of the cam disk 8 does not engage the ratchet wheel 7b of the driving wheel 7 so that it slides over them and is stopped at the position shown in FIG. 3. On the other hand, the catch holding disk 9 carried by the driving wheel 7 is also caused to rotate in the counterclockwise direction, but upon engagement of the shoulder portion 9f of the first ridge 9a of the disk 9 with the pawl 10b of the catch 10, the rotation of the disk 9 is stopped. When the seat belt 2 is further unwound so that the tooth 6c of the ratchet gear 6 pushes the pawl 10b outwardly, the pawl 10b is released from the first ridge 9a of the disk 9 so that the latter is permitted to rotate again, but upon engagement of the projection 9c of the disk 9 with the first stop 13b of the housing 13, the disk 9 is stopped again (See FIG. 4), while the driving wheel 7 is rotating. Under these conditions, the first ridge 9a of the disk 9 keeps the pawl 10b of the catch 10 away from the teeth 6c of the ratchet gear 6 so that no noise is generated even when the ratchet gear 6 continues to rotate.

The seat belt 2 thus unwound is fastened to restrain a driver or an occupant in a manner well known in the art. In this case, however, the seat belt 2 is unwound, in general, a length greater than a length required for snugly restraining the driver or the occupant so that the seat belt 2 must be rewound.

Referring to FIG. 4, in order to rewind the seat belt 2, the driving wheel 7 is rotated in the clockwise direction so that the cam disk 8 and the catch holding disk 9 are also rotated in unison with the driving wheel 7 (See FIG. 3) in the same direction because they are not restrained. As a result the pawl 10b of the catch 10 rides past the first ridge 9a of the disk 9 and drops into the recessed portion or valley 9e so that the pawl 10b engages the teeth 6c of the ratchet gear 6 as shown in FIGS. 6 and 8. Therefore the rotation in the clockwise direction of the ratchet gear 6 (that is, in the direction in which the seat belt 2 is retracted and wound) is restricted so that the first spring 4 with its inner end made fast to the ratchet gear 6 is locked.

It should be noted that the torque imparted to the winding shaft 3 is equal to the turning torque produced by the second spring 5 minus the torque imparted to the friction ring 14 (See FIG. 8) which is rotated under a light load. That is, since the rotation of the ratchet gear 6 is checked, the rotation of the driving wheel 7 causes the rotation in the clockwise direction of the friction ring 14. However, as described above, the torque imparted to the friction ring 14 is light so that the seat belt retracting and winding operation will not be adversely affected. Thus the winding force imparted to the seat belt 2 is reduced so that the restraining force acting on the driver or the occupant may be relaxed accordingly.

Figure 7:
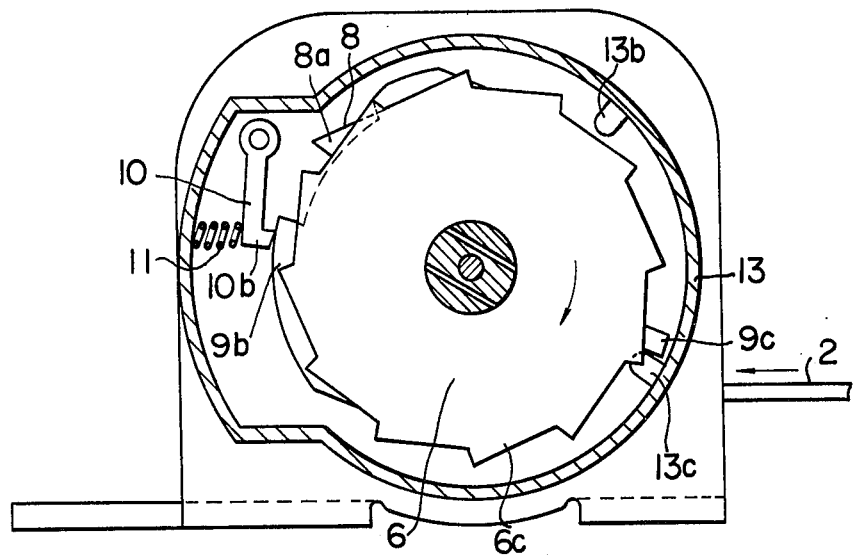

Next the mode of retracting and rewinding the seat belt 2 will be described when the driver or the occupant unfastens it. When the seat belt 2 is fastened, the cam portion 8a of the cam disk 8 is at the position shown in FIG. 5. When the seat belt 2 is unfastened, the second spring 5 unwinds itself to retract and wind the seat belt 2 around the winding shaft 3. Then the cam pawl 8c of the cam disk 8 engages with the teeth of the ratchet wheel 7b of the driving wheel 7 so that the cam disk 8 is caused to rotate in unison with the winding shaft 3, and at the position shown in FIG. 6 the cam portion 8a of the cam disk 8 upwardly pushes the pawl 10b of the catch 10. Since the pawl 10b is in engagement with the teeth 6c of the ratchet gear 6 (See FIG. 5) the first spring 4 imparts the turning torque to the catch 10, but the engagement of the cam pawl 8c with the teeth of the ratchet wheel 7b causes the cam portion 8a to overcome this turning torque so as to push upward the catch 10. Further rotation of the cam disk 8 causes the disengagement of the pawl 10b from the teeth 6c of the ratchet gear 6 as shown in FIG. 7. Then the first spring 4 which is stronger than the second spring 5 causes the ratchet gear 6 to rotate in the clockwise direction against the resistance produced by the heavy load torque of the friction ring 14 (See FIG. 8) until the second weak spring 5 has been completely wound. Therefore, no strong impact is transmitted to the second spring 5 and the spring retaining hook 6b (See FIG. 3) of the ratchet gear 6 due to the friction between the friction ring 14 and the ratchet gear 6. Since the second spring 5 has been completely wound or compressed, the seat belt retracting and winding force is provided only by the first spring 4 and is increased. Meanwhile the catch holding disk 9 rotates together with the cam disk 8 in the clockwise direction due to the rotation in the same direction of the winding shaft 3. When the cam disk 8 has completely pushed upward the pawl 10b of the catch 10, the second ridge 9b engages the pawl 10b as shown in FIG. 7 so that the pawl 10b does not engage the teeth 6c of the ratchet gear 6 and consequently the free rotation of the ratchet gear 6 in the clockwise direction is permitted, with the result that the seat belt 2 may be retracted and wound by the increased force.

It sometimes occurs that the winding shaft 3 is caused to rotate through beyond 360° after the driver or the occupant has fastened the seat belt 2 because he or she moves his or her body over a relatively wide range in order to operate, for instance, a door regulator handle on the opposite side. Then the cam disk 8 is caused to rotate from the position shown in FIG. 5 in the counterclockwise direction as the seat belt 2 is unwound and extended, and stopped at the position shown in FIG. 3. When the winding shaft 3 is rotated through beyond 360° from the position shown in FIG. 3 so as to rewind the seat belt 2, the one-way or unidirectional clutch is so actuated that the cam portion 8a of the cam disk 8 releases the ratchet gear 6 as in the case of the seat belt retracting and winding mode described above. As a result, the belt retracting and winding force is increased to a high level even though the seat belt 2 has been still fastened. However, after that, when the seat belt 2 is unwound and extended a little, the cam plate 8 and the disk 9 are caused to rotate from their positions shown in FIG. 7 in the counterclockwise direction to the positions shown in FIG. 3. Thereafter the catch 10 engages with the ratchet gear 6 as shown in FIG. 5 so that the belt retracting and winding force is changed over to a low level and consequently the restraining force is relaxed accordingly.

Figure 9:
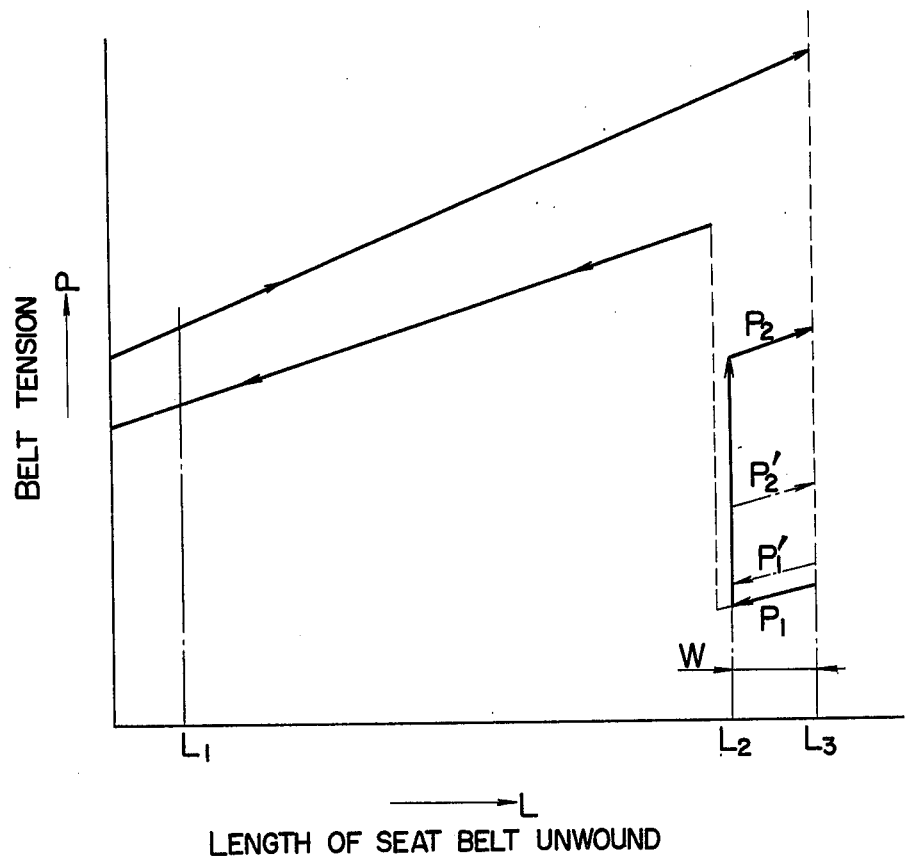
FIG. 9 is a graph used for the explanation of the operational characteristic of the device shown in FIG. 1.

In FIG. 9 the tension P of the seat belt is plotted along the ordinate while the length L of the seat belt extended out of the winding shaft 3 is plotted along the abscissa. A range W between $L_2$ and $L_3$ shows the range in which the seat belt tension P is reduced; that is, the range wherein the driver or the occupant may fasten the seat belt without feeling an excessive restraining force. $P_1$ indicates a force with which the seat belt is retracted and wound when the seat belt is fastened, while $P_2$ indicates a force with which the seat belt must be unwound and extended when it is fastened. For the sake of comparison, $P_1'$ and $P_2'$ are shown which correspond to $P_1$ and $P_2$, respectively, when the friction ring 14 is removed. $L_1$ indicates the length of the seat belt unwound when it is completely retracted; $L_2$, the length at which the first and second springs which have been operatively disconnected from each other are connected to each other; and $L_3$, the length at which the retraction of the seat belt is started. From the graph shown in FIG. 9 it is seen that when the seat belt is fastened, the seat belt retracting and winding force and hence the restraining force may be maintained at a low level unless the winding shaft 3 is caused to rotate through beyond 360°. However when the winding shaft 3 is caused to rotate through beyond 360°, the seat belt retracting and winding force and hence the restraining force may be changed over to a high level so that the seat belt may be quickly retracted and an optimum restraining force may be ensured.

So far the friction ring 14 made of a wire has been described as being fitted into the slit in the ratchet gear 6, but it is to be understood that a disk or the like may be interposed between the ratchet gear 6 and the driving wheel 7 in such a way that when the driving wheel 7 is rotated in one direction relative to the ratchet gear 6 a maximum frictional force may be produced therebetween and when the wheel 7 is rotated in the other direction a minimum frictional force may be produced. The one-way or unidirectional clutch between the cam disk 8 and the driving wheel 7 has been described as consisting of the ratchet wheel 7b formed integral with the driving wheel 7 and the pawl 8c formed integral with the cam disk 8, but the pawl 8c may be constructed and arranged independently of the cam disk 8 and pressed against the ratchet wheel 7b under the force of suitable spring means. Instead of forming the second ridge 9b integral with the disk 9 for keeping the catch 10 away from the ratchet gear 6, the stop or stepped portion 8b of the cam disk 8 may be formed with a further step for engagement with the catch 10 so as to keep it away from the ratchet gear 6. Instead of the second spring which is in the form of a spiralled belt, a helical spring of circular cross section made of a commonly used wire or a coiled spring made of a wire may be employed. Furthermore instead of completely compressing the second spring 4, the friction ring 14 may be so arranged and interposed between the ratchet gear 6 and the driving wheel 7 in such a way that the second spring 4 is not completely compressed and that the driving wheel 7 is rotated relative to the ratchet gear 6 only within 360°.

What we claim is:

1. A seat belt retracting and winding device comprising
    a frame;
    a winding reel rotatably supported by said frame;
    spring means connected between said frame and said winding reel and including a first spring and a second spring, said winding reel being adapted to wind thereon a seat belt with a spring force of at least one of said first and second springs;
    means operable in response to the rotation of said winding reel for controlling said spring means to operate selectively under a first operative condition and a second operative condition exerting larger and smaller spring forces, respectively, on said seat belt, whereby the winding force exerted on said seat belt is reduced when said spring means is operated under said second operative condition; and
    impact relaxing means disposed between said first and second springs and slowly releasing the compression of one of said first and second springs when the operative condition is changed over from the second condition to the first condition under predetermined rotation of the reel to wind the seat belt.

2. A seat belt retracting and winding device as set forth in claim 1 wherein
    said impact relaxing means includes a friction brake means to restrain the relative movement between said first and second springs.

3. A seat belt retracting and winding device as set forth in claim 2 wherein
    said friction brake means includes means for generating smaller frictional braking force in the belt retracting direction than that in the belt extending direction.

4. A seat belt retracting and winding device as set forth in claim 1 wherein
    said control means comprises a ratchet gear which constitutes a connecting member between said first and second springs, and a catch engageable with said ratchet gear.

5. A seat belt retracting and winding device as set forth in claim 4 wherein
    an annular recess is formed in an inside surface of said ratchet gear; and
    said impact relaxing means includes a member which is partly fitted into said annular recess for slidable movement therein so as to produce frictional braking force.

6. A seat belt retracting and winding device as set forth in claim 5 wherein
    said member for producing the frictional braking force comprises a ring-shaped sliding member having a portion extended radially inwardly therefrom and operatively connectable to said winding reel.

7. A seat belt retracting and winding device of the type comprising
    a housing;
    a winding shaft with a seat belt whose one end is made fast to said winding shaft and which is wound therearound;
    a first spring one end of which is secured to said housing;

a second spring one end of which is secured to said winding shaft and which is connected in series to said first spring; and control means for restraining said first spring from exerting its returning force to said seat belt when said seat belt is unwound and held extended against the forces of said first and second springs and for causing said first spring to exert its returning force to said seat belt when said seat belt is retracted;

said control means including means for relaxing the impact to be exerted upon said second spring when said first spring exerts its returning force to said seat belt.

* * * * *